United States Patent

[11] 3,556,540

| [72] | Inventors | Milton L. Benjamin;<br>David D. Walker, Chagrin Falls, Ohio |
|---|---|---|
| [21] | Appl. No. | 803,303 |
| [22] | Filed | Feb. 28, 1969 |
| [45] | Patented | Jan. 19, 1971 |
| [73] | Assignee | Erickson Tool Company<br>Solon, Ohio<br>a corporation of Ohio |

[54] COLLET CHUCK AND THE LIKE
8 Claims, 4 Drawing Figs.

[52] U.S. Cl. .................................................. 279/47,
279/76
[51] Int. Cl. .................................................. B23b 31/04

[50] Field of Search ............................................ 279/1(K),
76, 79, 80, 82, 89, 90, 91, 47, 48, 46, 50

[56] References Cited
UNITED STATES PATENTS
3,036,839  5/1962  Williamson ................... 279/48
FOREIGN PATENTS
270,102  1934  Italy ............................

*Primary Examiner*—Andrew R. Juhasz
*Assistant Examiner*—Donald D. Evenson
*Attorney*—Oberlin, Maky, Donnelly & Renner

ABSTRACT: A collet chuck having a radially movable locking means therein for locking a tool against axial withdrawal from and turning in the collet.

PATENTED JAN 19 1971

3,556,540

INVENTORS
MILTON L. BENJAMIN
DAVID D. WALKER

BY Oberlin, Maky, Donnelly & Renner
ATTORNEYS

COLLET CHUCK AND THE LIKE

BACKGROUND OF THE INVENTION

The present invention relates generally as indicated to a collet chuck and more particularly to a collet chuck having means for locking an end mill or like tool against turning and axial withdrawal with respect to the collet. An end mill, for example, generally has helical flutes thereon which tend to "hog" into a workpiece at a rate exceeding the axial feed of the spindle on which the chuck is mounted, and thus severe tensile stresses are imposed on the tool causing it to be axially pulled out of and turned in the collet.

SUMMARY OF THE INVENTION

The chuck disclosed herein includes a collet having tool locking means that cooperates with a shoulder and adjacent flat on the tool shank to prevent axial withdrawing movement and turning of the tool in the collet, this being a primary object of this invention.

It is another object of this invention to provide a novel collet chuck having a radially movable locking pin therein which, in its tool locking position, has its inner end radially overlapped with the shoulder of the tool shank and in juxtaposition with the adjacent flat of the tool shank, thus to prevent axial withdrawal and turning of the tool.

Other objects and advantages of the present invention will become apparent as the following description proceeds.

DESCRIPTION OF THE INVENTION

Figure 1:
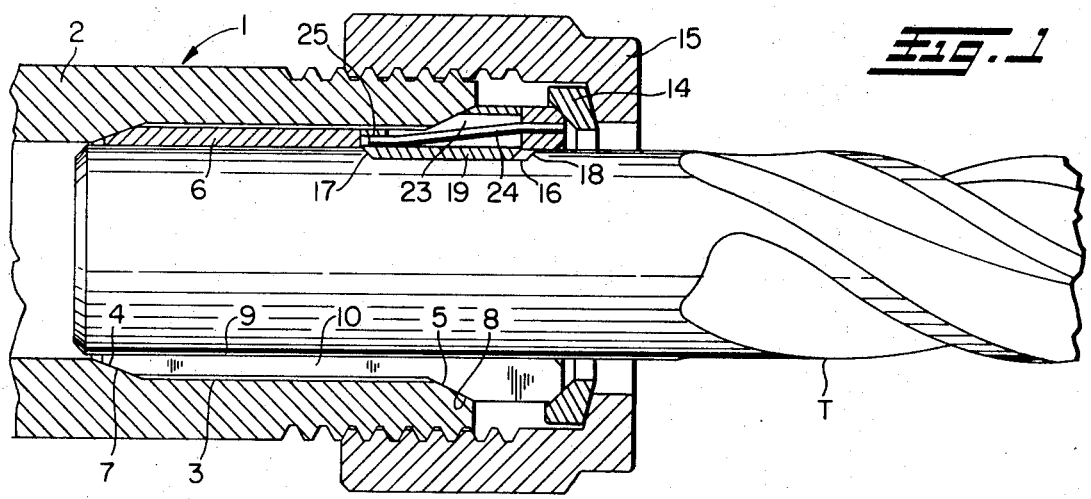
FIG. 1 is a central longitudinal cross section view of a collet chuck embodying the present invention.

The collet chuck 1 herein illustrated, comprises a chuck body 2 having at one end a cylindrical bore 3 terminating in parallel inner and outer frustoconical cam surfaces 4 and 5 which are widely spaced apart in an axial direction to provide for firm and accurate clamping of a tool T in the chuck 1.

The contractible collet 6 herein is provided with parallel frustoconical cam surfaces 7 and 8 which cooperate with the inner and outer cam surfaces 4 and 5 in the chuck body 2 so that when the collet 6 is moved axially inward with respect to the body 2, the interengaging cam surfaces 4;7 and 5;8 will cause contraction of the collet 6 into uniform gripping engagement with the shank of a tool T inserted within. The angle of the cam surfaces 4 and 5 and 7 and 8 is such that the collet 6 is self-releasing when axial inward pressure thereon is released.

In the present case, the bore 9 of the collet 6 will be made a close fit with the tool shank, and therefore, only one through slot 10 need be provided for contraction, and if desired, other relief slots 11 may be provided to facilitate uniform contraction when the collet 6 is urged axially inwardly with respect to the chuck body 2. The collet 6 has a beveled axially outer end face 12 with which is engaged a nose ring 14 and, in turn, a nose piece 15 which has threaded engagement with the chuck body 2 is engaged with said nose ring 14. Accordingly, with a tool T positioned in the collet 6, it can be seen that tightening of the nose piece 15 will, through the nose ring 14, urge the collet 6 axially inwardly into the chuck body 2 whereby the cooperating cam surfaces 4 and 7 and 5 and 8 will contract the collet 6 into tight gripping engagement with the tool shank.

In the case of an end mill or like tool T, the tool shank is provided with a flat 16 which forms beveled shoulders 17 and 18.

The collet 6 herein is provided with a radial opening in which is disposed a locking pin 19 having an exterior surface which is substantially flush with the outer cam surface 8 and with the adjoining cylindrical surfaces of the collet 6 when the locking pin 19 is in locking position as shown in FIG. 1. The edges of the inner end of the locking pin 19 are beveled at 20 and 21 as shown, the bevel 20 being engageable with the shoulder 17 of the tool to prevent withdrawal of the tool T from the collet 6.

Figure 2:
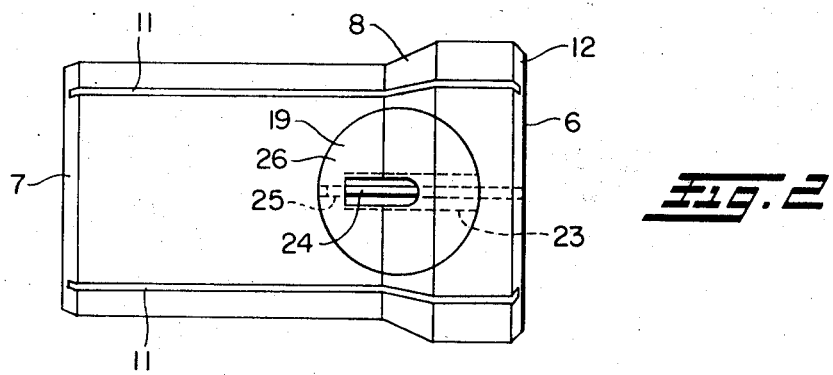
FIG. 2 is an elevation view of the collet as viewed downwardly from the top of FIG. 1.
Figure 3:
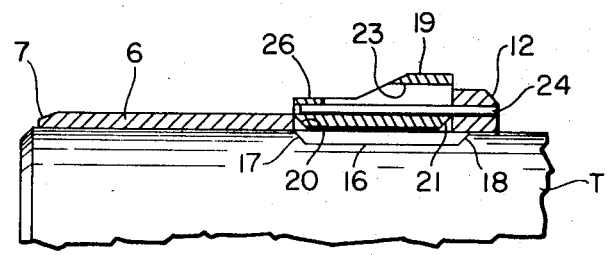
FIG. 3 is a fragmentary longitudinal cross section view of the collet and tool ready for insertion in the chuck body upon radial inward movement of the locking pin toward the flat on the tool shank.

In the form of the invention shown in FIGS. 1 to 3, the locking pin 19 is formed with an axial opening 23 which is larger than the axial retaining pin 24 which is press-fitted in an axial hole in the head end of the collet 6. The inner end of the retaining pin 24 is press-fitted in a hole 25 in the locking pin 19 thus to maintain the locking pin 19 in proper alignment so that its beveled edges 20 and 21 are transverse of the collet axis.

When the tool T is inserted in the collet 6 as in FIG. 3, the locking pin 19 may be pressed inwardly (with consequent flexing of the retainer pin 24) and the collet 6 and tool T are then inserted into the bore 3 of the body 2, the spring action of retainer pin 24 effecting frictional engagement of the cylindrical portion 26 of the locking pin 19 with the wall of bore 3. When the nosepiece 15 is tightened, the interengaging cam surfaces 4 and 7 and 5 and 8 will effect tight gripping of the tool T and the locking pin 19 will prevent axial withdrawal or turning of the tool T.

Figure 4:
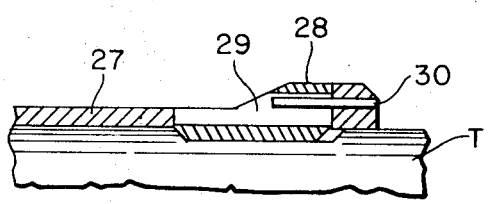
FIG. 4 is a fragmentary longitudinal cross section view of another collet embodying the present invention.

In the collet 27 in FIG. 4, the locking pin 28 has an axial opening 29 larger than axial retaining pin 30 to permit radial movement of locking pin 28 when the shank of tool T is inserted.

We claim:

1. A chuck comprising a body having a bore; a collet arranged to be radially contracted when axially moved in the bore in said body; a nosepiece on said body for so axially moving said collet; a radially disposed locking pin in said collet having an inner end adapted to radially overlap a shoulder on the shank of a tool to prevent axial withdrawal of the tool from said collet and having an outer end which is substantially flush with the exterior surface of said collet and in close proximity to the wall of the bore in said body; and an axially disposed retainer pin received in axially aligned openings in said collet and locking pin for retaining said locking pin in said collet.

2. The chuck of claim 1 wherein one of said openings in said collet and locking pin is larger than said retainer pin to permit limited radial movement of said locking pin for axial insertion of the tool shank shoulder therepast prior to insertion of said collet into the bore of said body.

3. The chuck of claim 1 wherein the opening in said locking pin is larger than said retainer pin to permit limited radial movement of said locking pin for axial insertion of the tool shank shoulder therepast prior to insertion of said collet into the bore of said body.

4. A chuck comprising a body having a bore; a collet arranged to be radially contracted when axially moved in the bore in said body; a nosepiece on said body for so axially moving said collet; a radially disposed locking pin in said collet having an inner end adapted to radially overlap a shoulder on the shank of a tool to prevent axial withdrawal of the tool from said collet and having an outer end which is substantially flush with the exterior surface of said collet and in close proximity to the wall of the bore in said body; and an axially disposed, laterally flexible retainer pin received in axially aligned openings in said collet and locking pin for retaining said locking pin in said collet and for permitting yieldable radial inward movement of said locking pin to radially overlap the tool shank shoulder axially inserted past the inner end of said locking pin.

5. A chuck comprising a body having a bore; a collet arranged to be radially contracted when axially moved in the bore in said body; a nosepiece on said body for so axially moving said collet; a radially disposed locking pin in said collet having an inner end adapted to radially overlap a shoulder on the shank of a tool to prevent axial withdrawal of the tool from said collet and having an outer end which is substantially flush with the exterior surface of said collet and in close proximity to the wall of the bore in said body; and said collet having retainer means to permit limited radial movement of said locking pin for axial insertion of the tool shank shoulder therepast prior to insertion of said collet into the bore of said body, said retainer means comprising an axially disposed retainer pin in said collet extending into an axial opening in said locking pin which has a radial dimension larger than that of said retainer pin to permit such limited radial movement of said locking pin.

6. The chuck of claim 5 wherein said retainer pin is laterally flexible and has axially spaced end portions respectively secured to said collet and locking pin for yieldable radial inward movement of the latter to a position whereat the inner end thereof radially overlaps the tool shank shoulder.

7. A chuck comprising a body having a cylindrical bore terminating in parallel, axially spaced apart frustoconical cam surfaces; a cylindrical contractible collet adapted to be axially inserted into said bore and having parallel frustoconical cam surfaces adapted to engage the respective axially inner and outer cam surfaces in said body; said collet having an axially outer head portion beyond the axially outer cam surface thereof; a nosepiece on said body for engaging said head portion and thus moving said collet axially in said body to contract said collet into gripping engagement with a tool shank therewithin; a radially disposed locking pin in said collet having an inner end adapted to radially overlap a shoulder on the shank of such tool to prevent axial withdrawal of the tool from said collet and having an outer end substantially flush with the axially outer cam surface of said collet and with the adjoining cylindrical and head portions; a retainer pin secured in an axial opening in said head portion and extending into an axial opening in the axially outer side of said locking pin which has a radial dimension larger than that of said retainer pin to permit limited radial movement of said locking pin for axial insertion of the tool shank shoulder therepast prior to insertion of said collet into the bore of said body.

8. The chuck of claim 7 wherein said retainer pin is laterally flexible and has its axially inner end secured to said locking pin adjacent the axially inner side thereof for yieldable movement of said locking pin radially inward to a position whereat said inner end radially overlaps said tool shank shoulder.